United States Patent
Wood et al.

(10) Patent No.: US 6,172,811 B1
(45) Date of Patent: *Jan. 9, 2001

(54) OPTICAL GRATING AND A METHOD OF FABRICATING AN OPTICAL GRATING

(75) Inventors: David Charles Wood; Stephen Anthony Cassidy; Mark Robert Wilkinson, all of Suffolk; Paul Francis McKee, Essex, all of (GB)

(73) Assignee: British Telecommunications public limited comany, London (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/780,681

(22) Filed: Jan. 8, 1997

Related U.S. Application Data

(62) Division of application No. 08/244,873, filed on Jun. 15, 1994, now Pat. No. 5,666,224.

(30) Foreign Application Priority Data

Jan. 10, 1992 (GB) .................................................. 9200616
Jan. 11, 1993 (WO) ........................................ PCT/GB93/43

(51) Int. Cl.[7] ................................. G02B 5/18; G02B 6/34
(52) U.S. Cl. ........................... 359/573; 359/566; 359/575; 385/37
(58) Field of Search ..................................... 359/572, 573, 359/575, 9, 569; 385/37; 372/19, 20, 96

(56) References Cited

U.S. PATENT DOCUMENTS

| 3,814,498 | * | 6/1974 | Tomlinson et al. ..................... 385/37 |
| 4,155,056 |   | 5/1979 | Cross et al. .......................... 385/130 |
| 4,687,286 |   | 8/1987 | Winful ................................. 359/900 |
| 4,740,987 |   | 4/1988 | McCall et al. ......................... 372/96 |
| 4,885,752 |   | 12/1989 | Okai et al. ............................. 372/45 |
| 5,040,188 |   | 8/1991 | Lang et al. ............................. 372/96 |
| 5,091,916 |   | 2/1992 | Cimini et al. .......................... 372/96 |
| 5,113,286 | * | 5/1992 | Morrison .............................. 359/569 |
| 5,121,250 |   | 6/1992 | Shinozaki et al. .................... 359/328 |
| 5,170,402 |   | 12/1992 | Ogita et al. ............................ 372/20 |
| 5,202,775 | * | 4/1993 | Feldman et al. ......................... 359/9 |

* cited by examiner

Primary Examiner—Audrey Chang
(74) Attorney, Agent, or Firm—Nixon & Vanderhye P.C.

(57) ABSTRACT

An optical grating includes a sequence of grating lines, the sequence being such that each grating line is centered on a position which is an integer multiple of a line spacing distance from a datum position on the grating, the sequence of grating lines is non-periodic and the sequence of the grating lines is formed from N concatenated sub-sequences. Each sub-sequence includes a series of one or more instances of a respective grating line pattern. Such an optical grating has a structure that is more amenable to calculation of the grating lines necessary to achieve a desired characteristic. A method of calculating and fabricating such a grating is also disclosed.

23 Claims, 13 Drawing Sheets

SET OF WORDS USED IN THE D-FIBRE GRATING DESIGN

SET OF WORDS USED IN THE DFB/DBR LASER GRATING DESIGN

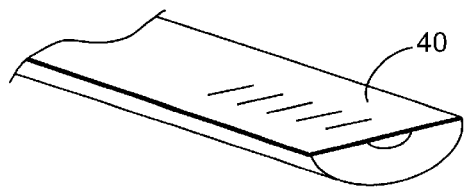
Fig.4(a).
Fig.9.
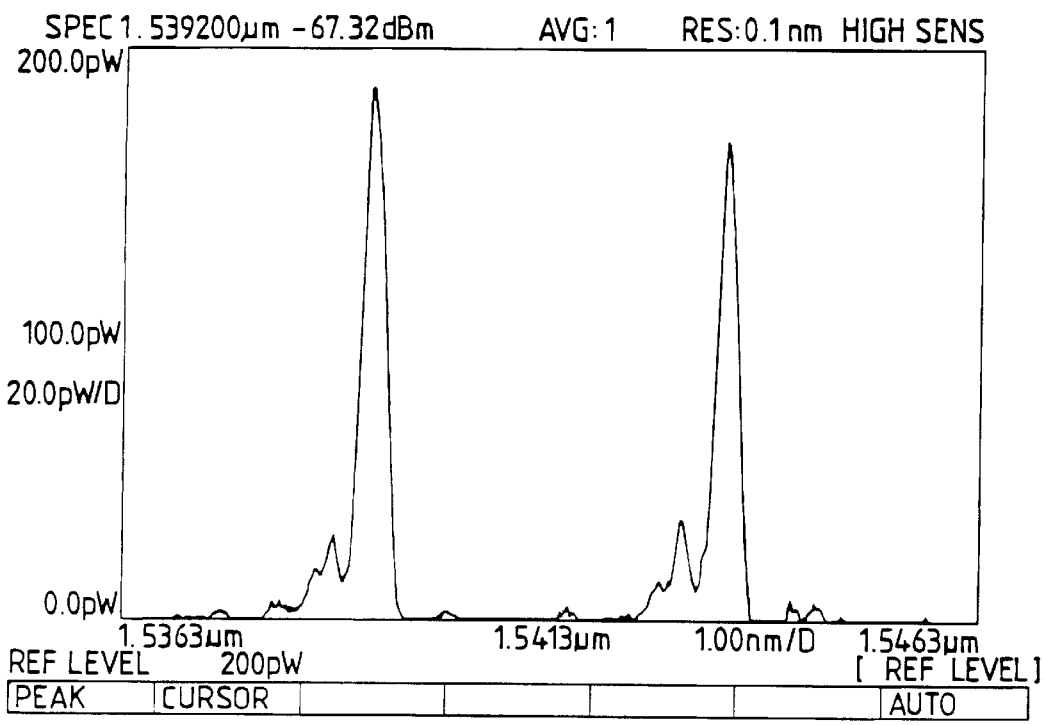

"n" IS THE EFFECTIVE REFRACTIVE INDEX OF THE S SUB-UNITS. EACH SUB-UNIT IS ADDRESSED THROUGH SEPARATE ELECTRODES

| | | | | | | | | | | | | | | | | | |
|---|---|---|---|---|---|---|---|---|---|---|---|---|---|---|---|---|---|
| LEVEL 0 | | | | | | | | | | | | | | | | | |
| LEVEL 1 | 0 | | | | | | | 1 | | | | | | | | | |
| LEVEL 2 (4"n" SECTIONS) | 0 | | | | 1 | | | | 2 | | | | 3 | | | | |
| LEVEL 3 | 0 | | 1 | | 2 | | 3 | | 4 | | 5 | | 6 | | 7 | | |
| LEVEL 4 | 0 | 1 | 2 | 3 | 4 | 5 | 6 | 7 | 8 | 9 | 10 | 11 | 12 | 13 | 14 | 15 | |
| LEVEL 5 | 0 1 2 3 4 5 6 7 8 9 10 11 12 13 14 15 | | | | | | | | | | | | | | | | |

0                    13                    31

OPTICAL GRATING AND A METHOD OF FABRICATING AN OPTICAL GRATING

This is a divisional application of application Ser. No. 08/244,873, filed Jun. 15, 1994, now U.S. Pat. No. 5,666,224.

BACKGROUND OF THE INVENTION

1. Field of the Invention

This invention relates to optical gratings.

2. Related Art

An optical grating can be considered to be a sequence of grating lines. The lines modify the reflection and transmission characteristics of an optical transmission medium to which the grating is applied so allowing the characteristics to be tailored, to a greater or lesser degree, to a desired application. For example, an optical grating is used in a distributed feedback laser (DFB) to control the wavelength at which the laser is able to lase. In another application, an optical grating is used to control the transmission characteristics of an optical waveguide, for example an optical fibre.

An article titled "D-Fibre Grating Reflection Filters", P Yennadhiou and S A Cassidy, OFC 90 (1990) describes a D-fibre mounted on a flat substrate to expose the optical field in the fibre core. A holographically formed grating was placed on top of the substrate to give a periodic sequence of changes to the effective refractive index seen by the electric field. The changes in refractive index caused by the grating are very small but at every change in index there is a small amount of light reflected back down the fibre. At a certain resonant wavelength these small reflections build up through constructive interference to provide a large reflection whose magnitude is determined by the length of the grating and the size of the refractive index change.) For a periodic grating with an arbitrary index profile this resonance occurs where the grating period is an integer multiple of half the wavelength, $\lambda/2$, divided by the mean effective index $n_0$. In the special case when the index profile is a sequence of discrete jumps, the resonance only arises when the period is a odd multiple of $\lambda/(2n_0)$.

At wavelengths around the exact resonance, the reflection has a characteristic "sin $(\lambda)/\lambda$" wavelength response profile of a finite-sized grating. The width of response peak is roughly inversely proportional to the grating length unless the reflectivity is very high. (see FIGS. 1(a) and 1(b)). When the peak reflectivity is high then multiple reflections become important and the reflection profile no longer narrows with increasing grating length. Instead the response flattens at around 100% reflectivity near the peak with very strong side lobes in the vicinity of the peak (see FIGS. 2(a) and 2(b)).

This characteristic profile is very difficult to change with conventional design methods. In particular, if the periodic change in effective refractive index is fixed by the material properties, then it is not possible to adjust the width of the wavelength response independently of the peak reflection. Nor is it possible by explicit design to remove the side lobe structure of smaller resonances on either side of the peak (although minor errors in the exact periodicity in the grating will often wash these out in practice).

Requirements have emerged which need reflection profiles that differ qualitatively from known prior art gratings. The first is to obtain a reflection profile that is flat over a comparatively large wavelength range (greater than about 1 nm wide) but with no side lobe reflections in the immediate neighbourhood of this range. The peak reflection in this case is not important but it needs to be at least 10%. Such an optical grating could be positioned within an optical fibre network so that the connection with a central control could be checked by monitoring the reflections from an interrogation signal sent from the control centre. The wavelength of the peak reflection would then be used to label the position of the grating and hence the integrity of the network could be checked at several places. A wide reflection is needed because the wavelength of the interrogation laser could not be accurately specified unless very expensive components were used. The side lobes need to be suppressed to prevent interference between different gratings in the network.

The second requirement is for a high reflection (as close to 100% as possible) in a narrow wavelength region, around 0.1 nm wide, with very low side lobes. This is for use as a wavelength selective mirror for use with a fibre laser to force it to operate in a narrow wavelength region only.

Other applications have been identified for non-conventional gratings where the wavelength response of the transmission and reflection properties could be specified. In particular, distributed Bragg reflectors (DBR) and distributed feedback lasers (DFB) appear to be very good candidates for such gratings.

It is a fairly straightforward matter, in principle, to calculate the effect on light travelling in one dimension of a sequence of steps in the effective index seen by this light. In a weakly guiding fibre waveguide both the electric field E and the magnetic field B are perpendicular to the direction of travel. The reflection and transmission coefficients are determined completely by the relation of E and B after passing through the region of index steps to their values before the region.

If the light passes a distance $\Delta z$ through a region with a constant effective refractive index $\beta$, then $$\begin{pmatrix} E \\ B \end{pmatrix}_{\Delta z} = \begin{pmatrix} \cos(\kappa \Delta z) & \dfrac{\sin(\kappa \Delta z)}{\beta} \\ \beta \sin(\kappa \Delta z) & \cos(\kappa \Delta z) \end{pmatrix} \begin{pmatrix} E \\ B \end{pmatrix}_0$$

or $$\begin{pmatrix} E \\ B \end{pmatrix}_{\Delta z_1} = \underline{M}(\beta_1, \kappa \Delta z_1) \cdot \begin{pmatrix} E \\ B \end{pmatrix}_0$$

where $\kappa$ is the effective wavenumber, $2\pi\beta/\lambda$, and $$\begin{pmatrix} E \\ B \end{pmatrix}_{\Delta z_1}$$

denotes the values of the electric and magnetic fields after a distance $\Delta z$. Hence if the light passes a distance $\Delta z_1$ through a region of effective index $\beta_1$, followed by a distance $\Delta z_2$ through a region of effective index $\beta_2$ then E and B are given by $$\begin{pmatrix} E \\ B \end{pmatrix}_{\Delta z_1 + \Delta z_2} = \underline{M}(\beta_2, \kappa \Delta z_2) \cdot \underline{M}(\beta_1, \kappa \Delta z_1) \cdot \begin{pmatrix} E \\ B \end{pmatrix}_0$$

The effect of a sequence of small steps through the regions of differing refractive index can therefore be calculated from a scattering matrix, given by the product of all the small step matrices. Note that the matrix coefficients depend on the wavelength $\lambda$. If the final scattering matrix S is given by $$\underline{\underline{S}} = \begin{pmatrix} s_{11} & s_{12} \\ s_{21} & s_{22} \end{pmatrix}$$

then the reflection coefficient is given by $|R|^2$ and the transmission coefficient by $|T|^2$ where $$R = \frac{[n_0 \cdot (s_{11} - s_{21}) - i \cdot (n_0^2 s_{12} - s_{21})]}{[n_0 \cdot (s_{11} + s_{22}) - i \cdot (n_0^2 s_{12} + s_{21})]},$$

$$T = \frac{2n_0}{[n_0 \cdot (s_{11} + s_{22}) - i \cdot (n_0^2 s_{12} + s_{21})]},$$

$n_0$ is the refractive index of the substrate and $i=(-1)^{1/2}$

A 5 mm long grating with a pitch of say 0.25 $\mu$m would have 20,000 steps and therefore the calculation for the scattering matrix would involve 20,000 matrix products. If the matrix were to be calculated at say 100 wavelengths in order to resolve the wavelength response of the grating, then the full scattering matrix of the grating would take several million arithmetic operations to calculate. This is therefore not a trivial calculation but one which would pose no difficulty for a reasonably powerful computer.

While the effect of a given sequence of steps in the effective index of the waveguide can easily be calculated, the converse task of designing the sequence to give the required properties to R and T is a different matter entirely. The problem lies in the number of calculations that have to be made. A crude approach of simply enumerating all the different possibilities, and testing each for its suitability, is out of the question even if the grating pitch was constant and the changes were restricted to allowing a refractive index step or not, then the total number of possibilities would be around $2^{20,000}$ so no amount of computer power would help.

In order to make any kind of optimisation, the grating has to be defined in terms of some traceable number of parameters and repeated calculations made of how the grating properties change with these parameters. This basic idea is known. Simple parameters that have been used are grating pitch which may, for example, vary slowly along the grating's length to form a chirped grating or gratings that miss out some of the steps in a regular or smoothly varying fashion. See for example T Schrans, M Mittelstein and A Yariv "Tunable Active Chirped-Corrugation Waveguide Filters" Applied Physics Letters 55, 212–214 (1989) and D C J Reid and C M Ragdale, I Bennion, D J Robins, J Buus and W J Stewart "Phase-Shifted Moire Grating Fibre Resonators" Electronic Letters 26, 10–12 (1990), respectively.

These known types of optical gratings are not amenable to approaches of computation that give enough degrees of freedom of device characterisation necessary to achieve the sort of wavelength response that are needed for many applications, for example as identified earlier in this application.

SUMMARY OF THE INVENTION

According to a first aspect of the present invention an optical grating including a sequence of grating lines, the sequence being characterised in that:

a) each grating line is centred on a position which is an integer multiple of a line spacing distance from a datum position on the grating;

b) the sequence of grating lines is non-periodic; and c) the sequence of grating lines is formed from a multiplicity of N concatenated subsequences, each subsequence comprising a series of one or more instances of a respective grating line pattern.

The present invention provides an optical grating having a structure that is more amenable to calculation of the grating lines necessary to achieve a desired effect as will be explained in more detail below. It is preferable that $N=2^M m$ where M is a whole number, although a grating may comprise two or more such sequences with some decrease in efficiency of calculation.

The number of subsequences can in effect be reduced by incorporating a number of null sections of zero length. For example, in a preferred embodiment of the present invention, if two adjacent subsequences are found during calculation to be formed from the same gating line pattern they are combined into one larger subsequence for future calculation, the number of subsequences being restored by insertion of a null subsequence.

The substrate may be an optical waveguide such as an optical fibre having a D-shaped cross-section. Other substrates may be used as with known optical gratings.

The grating lines may be grooves in the substrate, for example, the grooves having a rectangular cross-section or having triangular cross-sections, for example. The grating lines may be also be defined by refractive index variations in a substrate or other medium.

The grating sequence is formed from a multiplicity of subsequences of the type described above in order to give the flexibility of design while allowing tractable calculation of the optical characteristics of a grating.

The sequence of grating lines is non-periodic so as to allow for non-periodic phase shifts between the grating lines which are necessary to achieve reflection profiles which are qualitatively different to those that can be achieved by conventional gratings. Thus use of a non-periodic sequence of grating lines gives flexibility in the design process, while use of subsequences ensures that the design process remains tractable as will be explained below.

Such considerations are of utmost importance in a design problem of this size as any optimisation method will involve repeated calculations of the total scattering matrix with different parameter values to see which one is the best.

The main consideration in the design algorithm is therefore concerned with providing an efficient method of calculating the total scattering matrix of a grating as efficiently as possible. As will be seen, the structure of grating according to the present invention allows such efficient calculation of the scattering matrix.

The design process of a grating according to the present invention involves determining the values of the parameters of the subsequences, ie the grating line pattern and the number of instances of each pattern in a given subsequence, to obtain desired properties in the resultant optical grating. To do this it is necessary to change these parameters one or a few at a time, and compare the new calculated properties of the grating with the old ones to see if there has been any movement towards the desired characteristics.

Because the sequence of grating lines of the optical grating is made up of subsequences as described above it is possible to calculate the total scattering matrix of an optical grating more rapidly than if it was necessary to calculate all the properties of the grating from scratch. Because the grating is split up into a number of sections N, where N is an exact power of 2, $N=2^M$, then it can be shown that the effect of change in $\log_2(N)$ matrix multiplies rather than the N multiplies needed in a cruder algorithm which directly calculates the entire new matrix.

According to a second aspect of the present invention a method of fabricating an optical grating comprises the steps of:

calculating the response of an optical grating including a sequence of grating lines, the grating lines being such that:

each grating line is centred on a position which is an integer multiple of a line spacing distance from a datum position on the grating;

the sequence of grating lines is non-periodic; and the sequence of grating lines is formed from N concatenated subsequences, each subsequence comprising a series of one or more instances of a respective grating line pattern; and subsequently repeatedly altering a subsequence of the grating deciding whether to accept the alteration of the subsequence until some predetermined criterion is achieved; and on achieving the predetermined criterion; forming the resultant optical grating sequence on a substrate.

The method preferably includes the additional prior steps of:

selecting a set of grating line patterns; and calculating the scattering matrix of each member of a set of grating patterns.

The subsequence is preferably altered by either substituting the respective grating line pattern for a different grating line pattern from the set of grating line patterns or changing the number of instances of the grating line pattern in the subsequence. Other operations to change subsequences can be used; the grating line patterns of two subsequences may be interchanged, for example.

The decision whether to accept an alteration to one of the subsequences is preferably determined by an annealing algorithm. In particular an alternation to a subsequence is accepted if the change in a measure of fit of the grating profile to a desired profile is such that $\exp[-|\delta v|/T]$ is less than a random number generated in the range 0 to 1 for some value of T and where v is a predetermined measure of the performance of the grating.

T preferably is monotonically decreased between alterations to the sequence of grating lines.

It should be noted that the grating line patterns may include null grating pattern of zero length.

In addition to requirements for optical gratings which have reflection profiles that differ qualitatively from known prior art gratings, as discussed above, there have emerged further requirements for gratings whose characteristic profile can be altered in use. For example, there is a requirement in wavelength division multiplexed optical communications systems for both tunable lasers and tunable filters. Such a tunable laser can be achieved in a known manner by providing means for controlling the refractive index of the grating in a DBR or DFB laser. It will be understood that changing the refractive index of a grating means uniformly changing the refractive index across the whole of the grating, or a substantial part thereof, and does not affect the relative index variation which actually constitute the grating itself i.e. the small steps in refractive index which form the grating lines.

The alteration of the characteristic profile of a grating can be achieved for example, in a grating formed in a semiconductor material, by providing an electrical contact adjacent the grating for injecting current into the grating region so as to alter the refractive index of the material in which the grating is formed. An alternative method of altering the characteristic profile of a grating is to physically alter the structure of the grating or a part thereof by for example employing piezo-electric transducers to stress or stretch the grating.

It has been found that the structure of a grating according to the present invention in addition to being more amenable to calculation of a particular desired fixed characteristic profile, is also more amenable to calculation of a characteristic profile which can be varied in a desired manner during use of the grating.

Thus the present invention also provides a grating in which a plurality of sub-units of the grating, each sub-unit formed from a plurality of subsequences, are separately addressable by means for altering a parameter of each grating sub-unit.

The multiplicity of sub-sequences from which the grating is formed again give flexibility in the design of, in this case, a variable characteristic profile of the grating, while at the same time enabling the calculation of the profile to be tractable.

The design process required for such a grating, having a characteristic profile which can be varied in use, can be regarded as an extension of the design process for a grating having a fixed characteristic profile. The ability to vary a parameter, for example the refractive index, of a plurality of sub-units of the grating gives an extra degree of freedom in the design process so that any optimisation of the grating design must effectively be two-dimensional, eg the physical structure of the grating sequence comprising the positioning of the grating lines must be optimised in conjunction with the choice of refractive indices for each of the grating sub-units, as will be explained below.

The use of such a design process allows a grating to be designed, which has for example four separately addressable sub-units whose refractive index may be varied in use so as to provide a reflection profile which is tunable over a wider range of wavelengths than a conventional periodic grating.

BRIEF DESCRIPTION OF THE DRAWINGS

The present invention will now be described, by way of example only, with reference to the accompanying drawings in which:

FIG. 9 is a graph of the measured response of the optical grating of FIG. 6.

DETAILED DESCRIPTION OF EXEMPLARY EMBODIMENTS

FIGS. 1(a), 1(b), 2(a) and 2(b) have already been discussed.

Figure 1A:
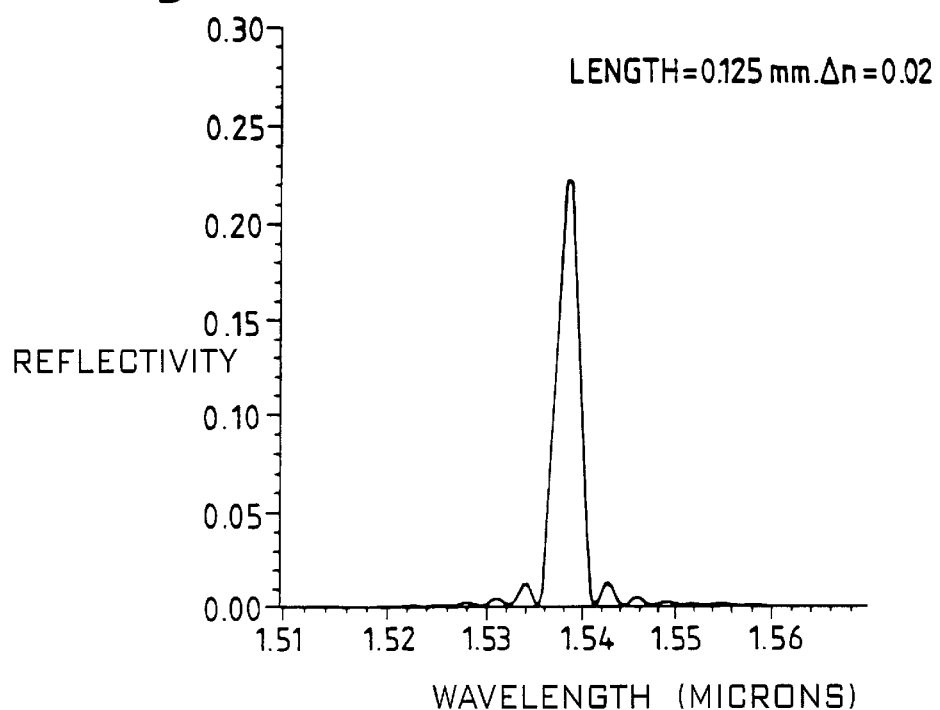
FIGS. 1(a) and 1(b) are graphs of the grating responses of prior art optical gratings having grating lines with a flat-triangle section groove.
Figure 1B:
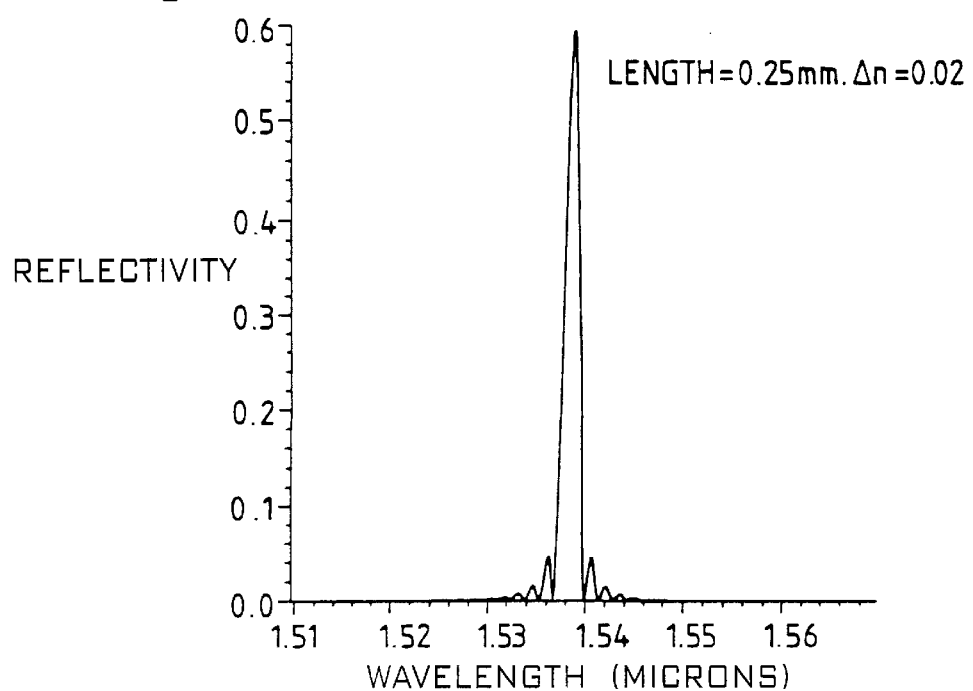
Figure 2A:
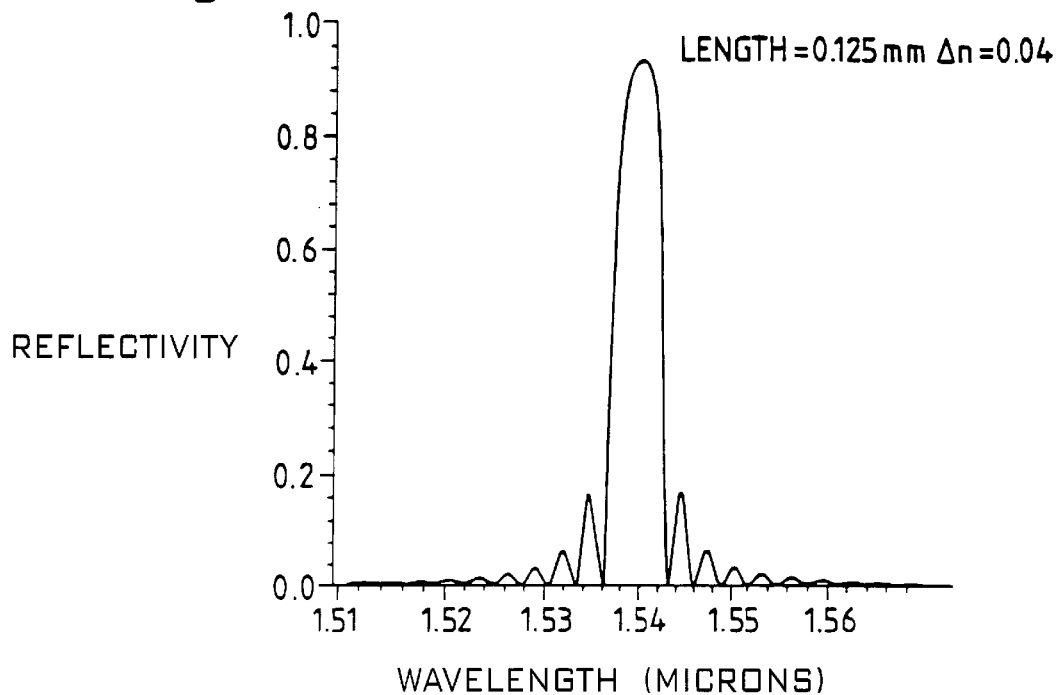
FIGS. 2(a) and 2(b) are graphs of the grating responses of prior art optical gratings having high peak reflectivity.
Figure 2B:
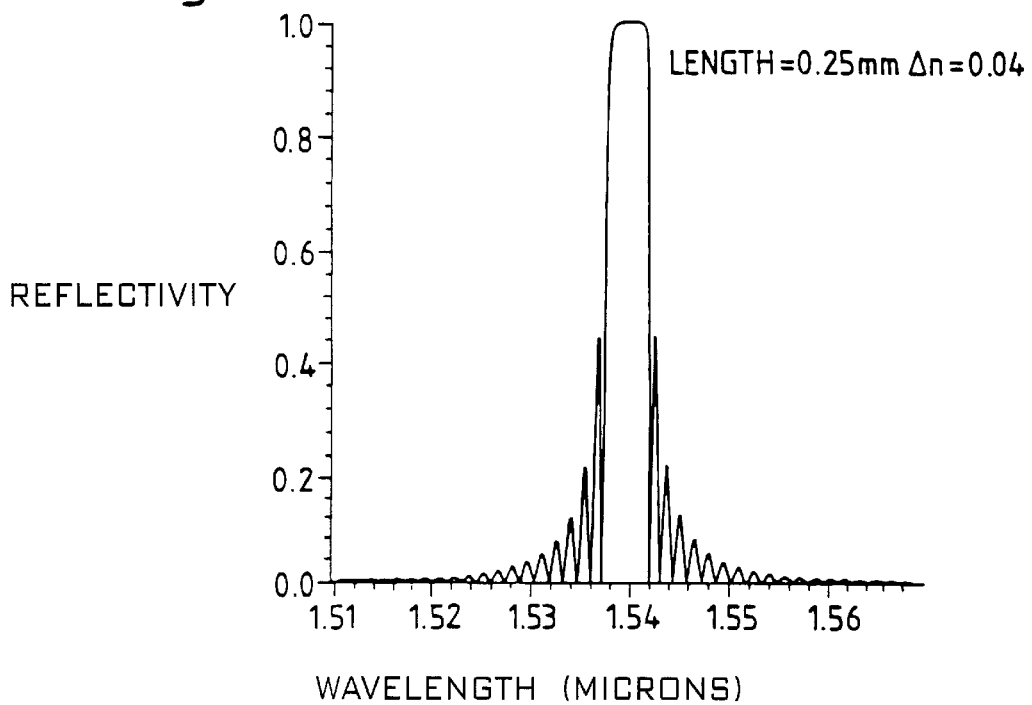
Figure 3:
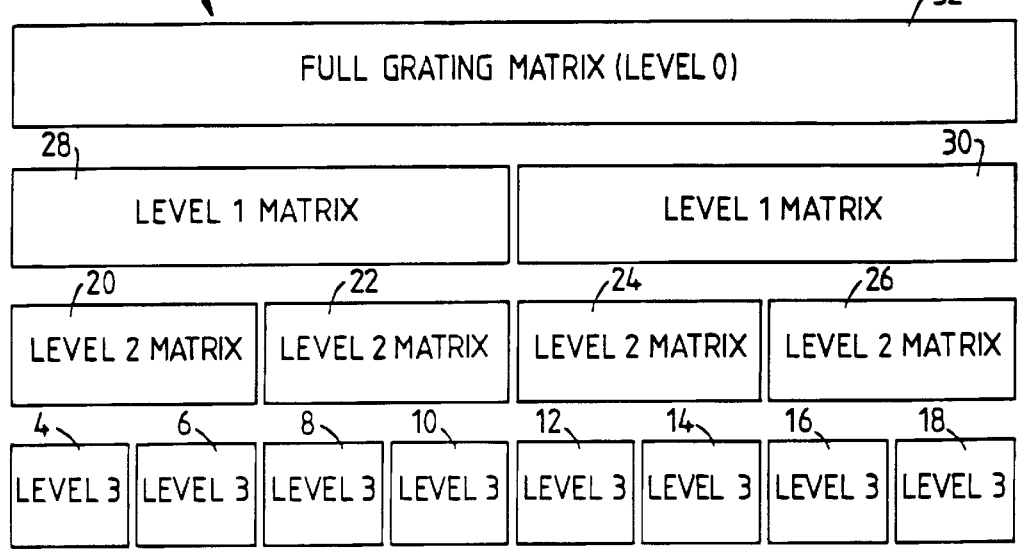
FIG. 3 is a schematic block diagram of an optical grating according to the present invention.

Referring to FIG. 3 an optical grating 2 according to the present invention is shown schematically to show its overall subsequence structure. The grating 2 is a sequence of grating lines formed, in this particular instance, by 8 (=$2^3$) subsequences 4, 6, 8, 10, 12, 14, 16 and 18. Each of the subsequences is formed from a series of one or more instances of a respective grating line pattern. The particular grating line pattern and the number of instances of it in a particular subsequence will in general vary from one subsequence to another.

Figure 4:
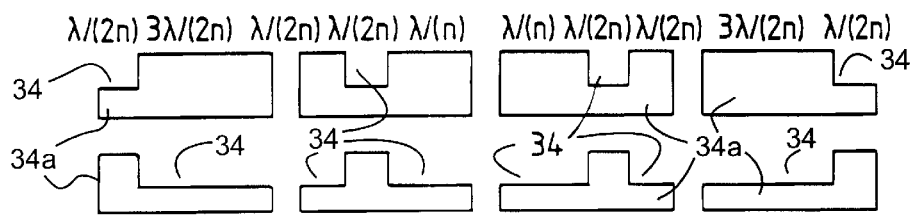
FIG. 4 is a diagram of a set of grating line patterns suitable for optical gratings that are to be etched on an optical fibre waveguide as in FIG. 4(a)
Figure 5A:
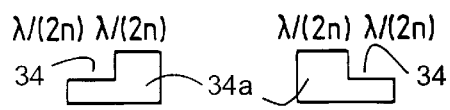
FIG. 5 is a diagram of a grating line patterns suitable for an optical grating for a DFB/DBR laser grating as in FIG. 5(a)
Figure 5:
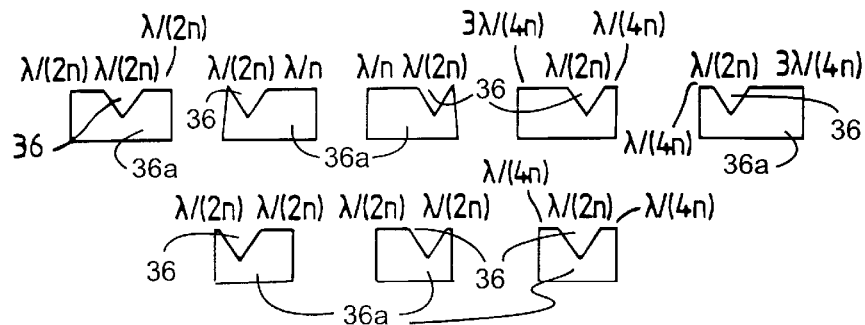

FIGS. 4 and 5 show sets of grating line patterns useful for subsequences for an optical fibre grating 40 of FIG. 4(a) and DFB/DBR laser grating 50 of FIG. 5(a) respectively A typical set of grating line patterns comprising grooves 34 having a rectangular cross-section used for optical D-fibre grating designs 40 FIG. 4(a) for fabrication on a silica substrate 34a, are shown in FIGS. 4 and 4(a). This is an exemplary set of grating line patterns—other sets could be chosen instead. For a DBR/DFB laser grating as in FIG. 5 which is written on an InP substrate, the fabrication processes force a different type of grating line pattern to be chosen, eg triangular cross-section grooves 36. On these substrates 36a it is very difficult to cut vertical walls, so discreet steps in the refractive index profile cannot be easily achieved. The typical groove has a triangular cross-section, in this case with etch angles of around 55°, an exemplary set being shown in FIG. 5.

Referring once again to FIG. 3, the optical effect of the subsequences 4 to 18 of the grating is calculated as follows. The scattering matrix for each grating line pattern is calculated beforehand in a known manner as described earlier. The scattering matrix for a given subsequence 4,6,8,10,12, 14,16 and 18 can then be calculated by raising the appropriate grating line pattern scattering matrix to a power equal to the number of instances of that pattern in a subsequence. This is carried out for all the subsequence 4 to 18 of the grating line sequence.

The scattering matrices for consecutive pairs of the subsequences are then calculated by forming the product of the scattering matrices of the subsequences. These products form the second level scattering matrices 20,22,24 and 26 of the grating.

In a similar fashion the level 2 scattering matrices are paired and the level 1 scattering matrices 28 and 30 are calculated. The two, level 1 scattering matrices 28 and 30 are finally combined to form the full, level 0 scattering matrix 32.

If one of the level 1 subsequences is changed during application of an optimization algorithm, for example subsequence 12, then to calculate the new full grating scattering matrix one calculates the matrix product of subsequences 12 and 14 to form a new level 2 matrix, 24, which is then multiplied with the existing level 2 matrix, 26, to form a new level 1 matrix number 30. This finally is multiplied with the other existing level 1 matrix 28 to form the full scattering matrix 32 for this new sequence of grating lines.

Figure 6:
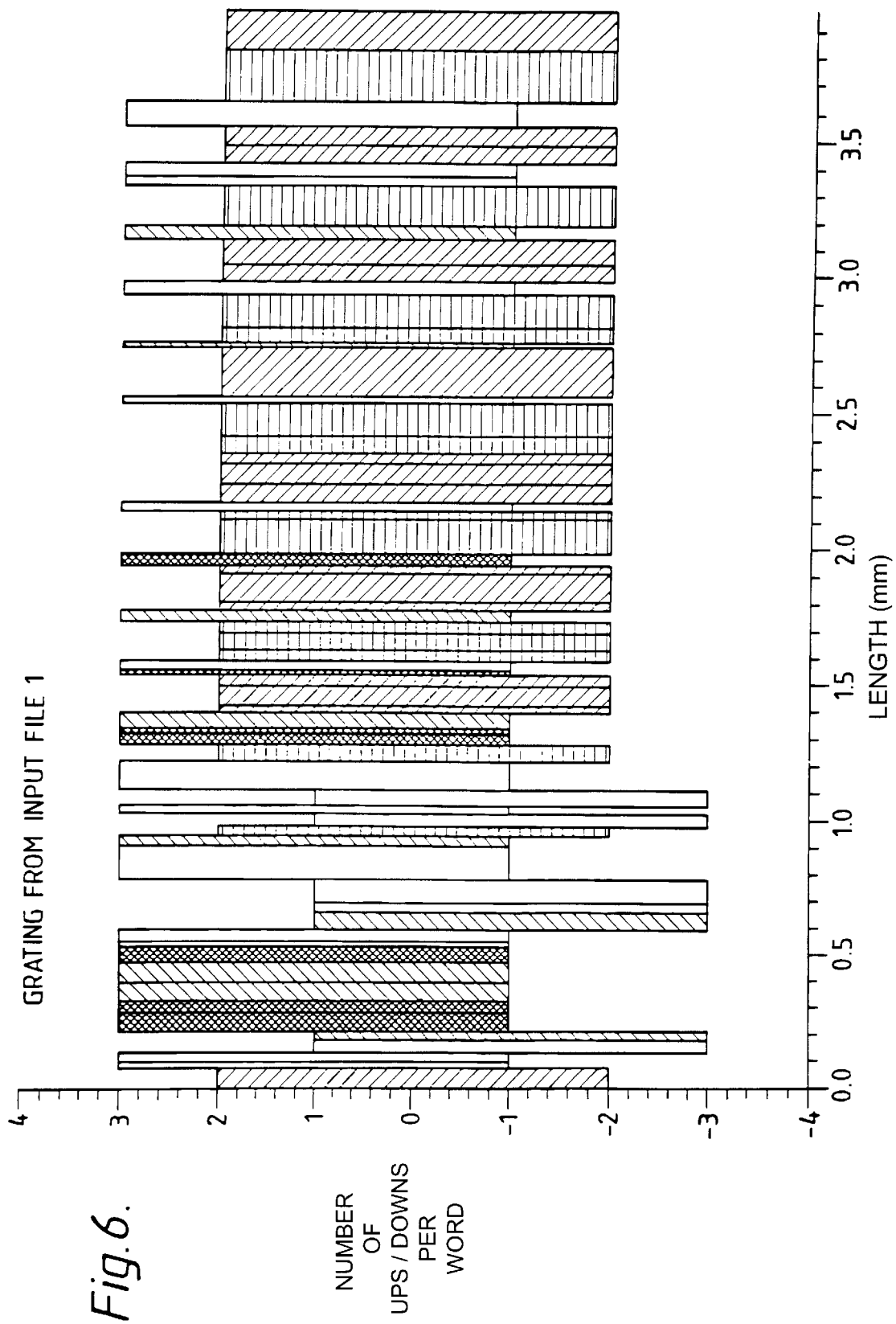
FIG. 6 is a representation of a grating according to the present invention.
Figure 7:
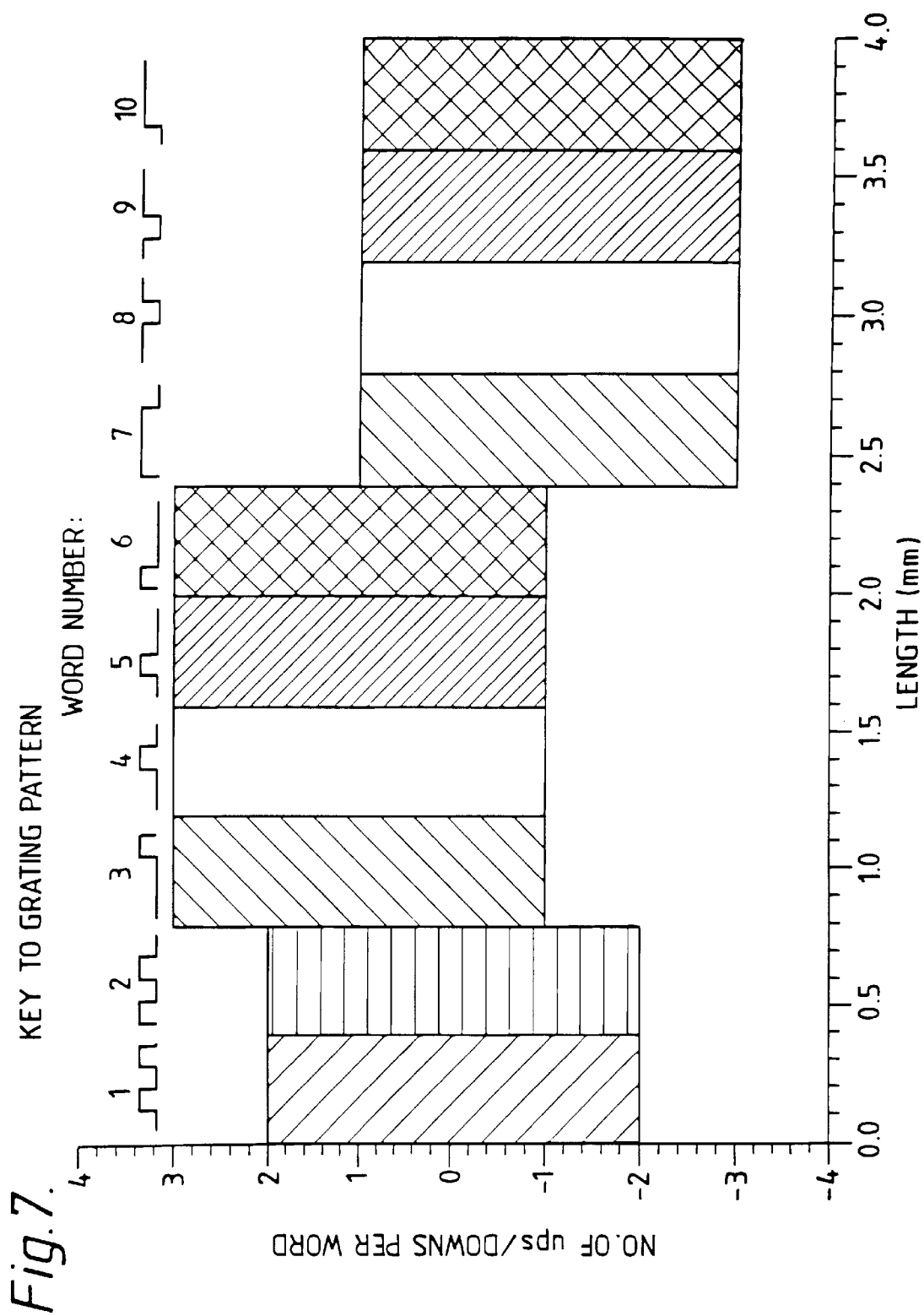
FIG. 7 is a key to the representation of the grating shown in FIG. 6 showing the grating line patterns employed.
Figure 8:
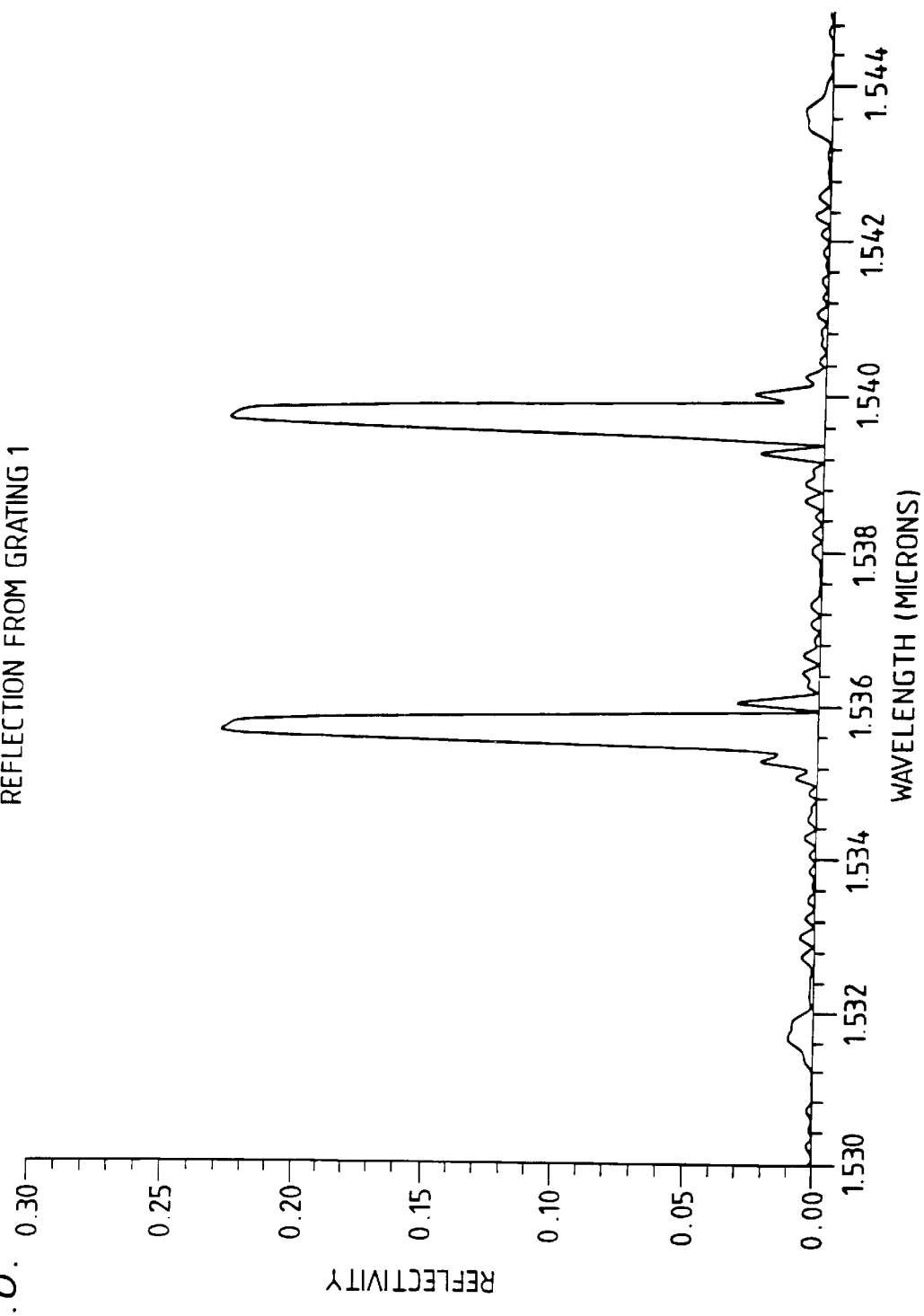
FIG. 8 is a graph of the theoretical response of the optical grating of FIG. 6.

Referring now to FIG. 6, there is shown a particular optical grating calculated according to the method of the present invention comprising ten grating line patterns as shown by the key at FIG. 7 and the theoretical response is shown at FIG. 8.

The basic pitch of the grating line patterns of FIG. 7 are about 0.5 $\mu$m with a single smallest feature (one line) of about 0.25 $\mu$m. The word patterns consist of 4 bits, each word being about 1 $\mu$m long. The total length of the grating of FIG. 6 is about 4 mm with 64 subsequences including any null subsequences that may have been introduced when adjacent subsequences of the same grating line pattern were combined. The patterns were etched into a silica substrate to a depth of about 0.25 $\mu$m.

FIG. 9 is a graph of the experimentally measured reflection characteristics of the optical grating of FIG. 6 after applying the optical fibre waveguide to the surface of a D-fibre optical fibre waveguide.

The structure of the grating according to the present invention allows efficient calculation of changes to the scattering matrix and so allows efficient implementation of optimisation algorithms. The optimisation algorithm used in the present instance will now be described, by way of example.

The first step was to choose the shape of the desired reflection characteristics of the grating as a function of wavelength $R_T(\lambda)$ and compare the actual reflection $R_A(\lambda)$ obtained from the grating with the desired one. The measure of the difference between the two was defined as $$\beta^2 = \int (\alpha |R_T|^2 - |R_A|)^2 d\lambda$$

where $$\alpha = \int (|R_T|^2 \cdot |R_A|^2 d\lambda) \bigg/ \int (|R_T|^4 d\lambda)$$

$\alpha$ is, in effect, a measure of the scale of the reflection and $\beta$ a measure of the fit to the desired shape. The aim was to minimise $\beta$ and maximise $\alpha$. Depending on the particular situation, a global measure v can be formed from a weighted difference of the two numbers to give the parameter to be optimised ie setting v=(1−w).$\alpha$−w.$\beta$, where w is a weighting parameter between 0 and 1. A larger value of w means that more weight is being attached to the shape of the refraction profile at the possible expense of the total reflectivity.

We then sought to maximise v and used a version of a simulated annealing algorithm to determine the grating line sequence which led to a suitable maximum. In this algorithm a change was made to the grating either by changing one of the work patterns or changing the length or interchanging two of the subsequences. These changes were done sequentially to randomly chosen subsequences, one subsequence being changed or two interchanged before recalculating the response of the grating. Other more complicated changes may be made but at the expense of increased calculation. To simplify the scheme of this embodiment the interchange step may be eliminated.

Using this algorithm we then calculated the change $\Delta$v in the measure of the grating performance caused by the grating alteration. If $\Delta$v increased, ie the new grating was "better" than the old one, then the change to the grating was accepted. If $\Delta$v was decreased by the alteration to the subsequences, then the change was only accepted if exp[−

|δv|/T] was less than a random number generated in the interval 0 to 1, where T was a parameter that represents a fictitious temperature.

If T was high, then nearly all the changes were accepted and v wanders around almost randomly. As T was decreased then the chances of accepting a change that decreases v gradually reduced and v was forced into a maximum.

Such a maximum is very probably a local maximum so there will in general be expected to be many solutions that result in the value of v very close to the best one obtained.

The strategy usually adopted, as here, was to make several independent calculations using different random seeds, and then pick the best grating line sequence that resulted. The measure of the value of a particular grating was to some extent arbitrary and other measures of fitness of fit of grating could be used. In particular, if one is interested in the dispersion properties of a grating then one would use the full complex form of the target response $R_T(\lambda)$ and the actual reflection $R_A(\lambda)$ and the definitions of $\alpha$ and $\beta$ rather than their moduli.

The calculated grating sequence was then used to fabricate a grating by forming the grating lines as a sequence of vertically walled, etched steps by electron-beam lithography directly onto a silica substrate. The experimentally measured response of the grating of FIG. 6 is shown at FIG. 9.

Figure 10:
FIG. 10 is a representation of a portion of the grating of FIG. 6 at a transition between two subsequences.

FIG. 10 shows a portion of the grating of FIG. 6 at a transition between two subsequence 38 and 40.

The method of fabricating an optical grating according to the present invention has been described in terms of a grating line sequence which is made up of a whole number power of 2 subsequences. This structure obtains the full benefit of the present invention. However, it is also possible to obtain the principle benefit of the invention if a grating sequence comprises a small number of concatenated sequences each sequence being as described above. In such a case there will be a small overhead in the calculation as two level 0 scattering matrices will need to be multiplied together. Thus a grating comprising a number of grating sequences each having $2^M$ subsequence according to the present invention in series can be calculated with slightly less efficiency than a grating having an exact power of two subsequences.

Figures 11, 13:
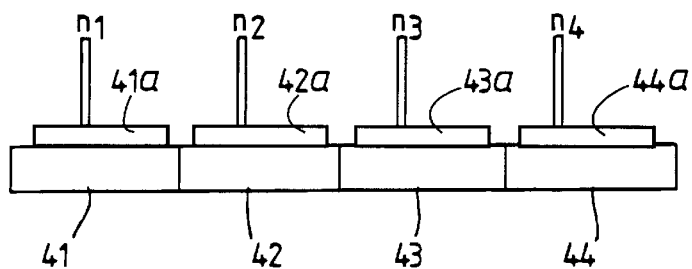
FIG. 11 shows a grating in 4 sub-units, the refractive index n of each sub-unit may be varied by current injected via an electrode.
FIG. 13 is a schematic diagram, similar to that shown in FIG. 3, showing the sequence of scattering matrix calculations required when the refractive index of a grating sub-unit is changed.

FIG. 11 shows a grating whose characteristic profile can be altered in use. The grating is divided into four sub-units 41, 42, 43, 44, each of which is separately addressable through an electrode. Thus the refractive index of each of these sub-units can be controlled between two values which are given, in a known manner, by the properties of the semiconductor material used, by applying a voltage to each of the electrodes. The reflection profile of the grating can be switched between a number of different responses by applying different sets of voltages to the sub-units 41–44. In FIG. 11, 'n' is the effective refractive index of the sub-units, each of which is addressed through separate electrodes 41a, 42a, 43a and 44a.

The design process for this grating unit therefore specify a grating sequence, formed from sub-sequences of grating line patterns, and must also specify the particular refractive indices for each of the sub-units required to achieve switching between the desired characteristic responses.

Thus if four particular responses A, B, C, D are required from the grating then the design process must optimise both the grating sequences and the four sets of refractive indices $n_1, n_2, n_3, n_4$ required to achieve these four responses, so that the grating characteristic is

| A | when | $\{n_1, n_2, n_3, n_4\}$ | is | $\{a_1, a_2, a_3, a_4\}$ |
| B | when | $\{n_1, n_2, n_3, n_4\}$ | is | $\{a_1, a_2, a_3, a_4\}$ |
| C | when | $\{n_1, n_2, n_3, n_4\}$ | is | $\{a_1, a_2, a_3, a_4\}$ |
| D | when | $\{n_1, n_2, n_3, n_4\}$ | is | $\{a_1, a_2, a_3, a_4\}$ |

It should be noted that the grating line sequence remains fixed in each case, the only thing that changes is the sequence of refractive indices. This sequence can be changed by applying different voltages through the independent electrodes.

The design method for grating having a variable reflection characteristic thus differs from that for a grating having a fixed reflection characteristic in a number of respects. Firstly there is always a choice during the calculation of the design process of whether to change a grating subsequence (as for the fixed response grating) or to change the refractive index of a sub-unit of the grating, this is shown schematically in the flow diagram of FIG. 12. If the choice to change a grating subsequence is made than the scattering matrices are recalculated in the same manner as for the fixed response grating as described above. If the choice is to change the refractive index of a grating sub-unit then the recalculation is different as will be described below.

Secondly, a further difference for the variable response grating design method is that a set of scattering matrices corresponding to each of the difference sequences ($n_{1-4}$) of refractive index for the grating sub-units must be calculated. Thus if four different reflection responses are required from the grating, four sets of scattering matrices required to give the four different reflection coefficients as a function of wavelength, must be calculated.

Thirdly a different measure of fit between the calculated matrices and the target response is required, since the target response is in fact a number of responses, each corresponding to one of the sequences of refractive indices of the grating sub-units.

Figure 12A:
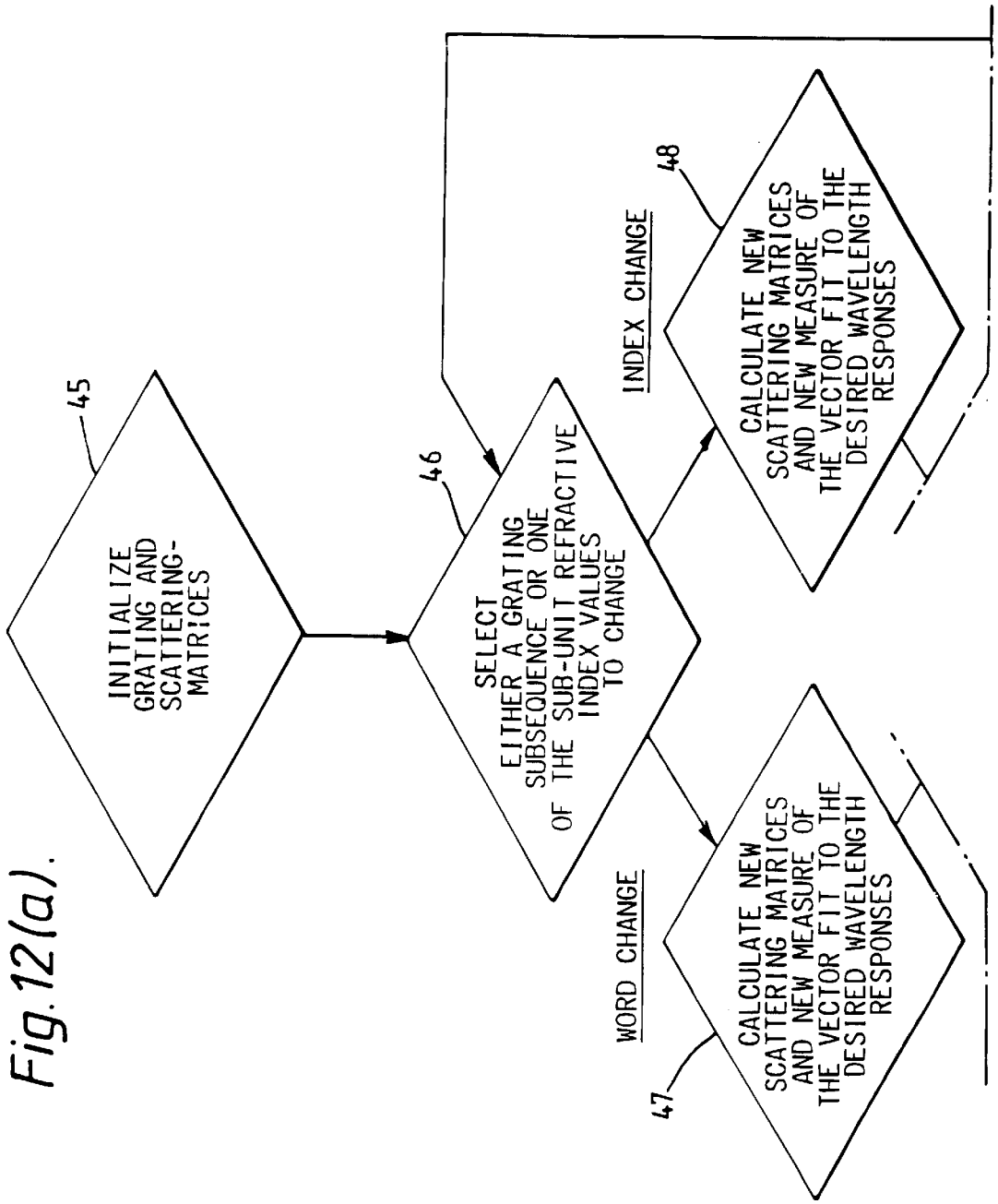
FIGS. 12(a) and 12(b) are a schematic flow diagram showing the stages of the method of designing a grating having a variable reflection response.
Figure 12B:
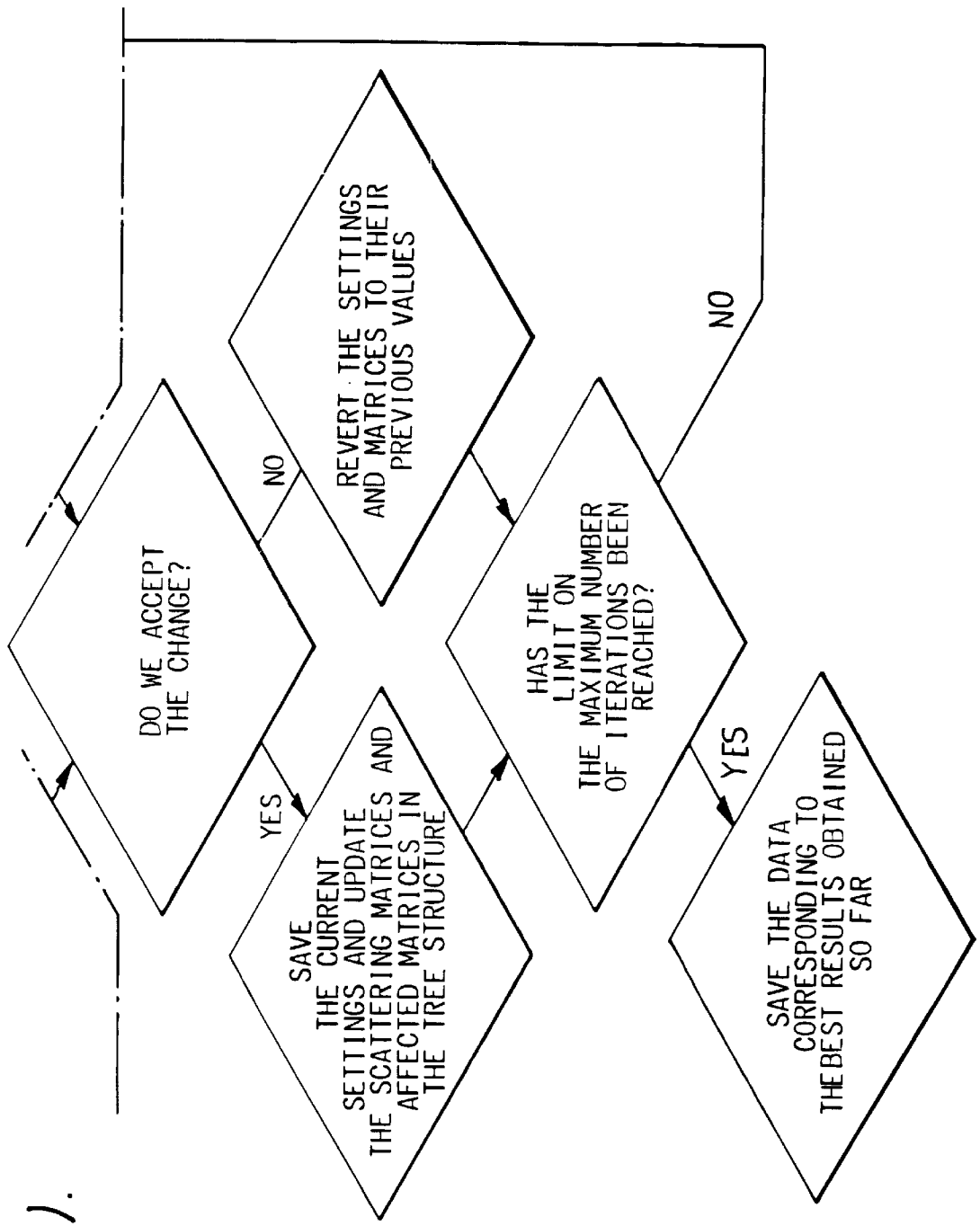
Figure 14A:
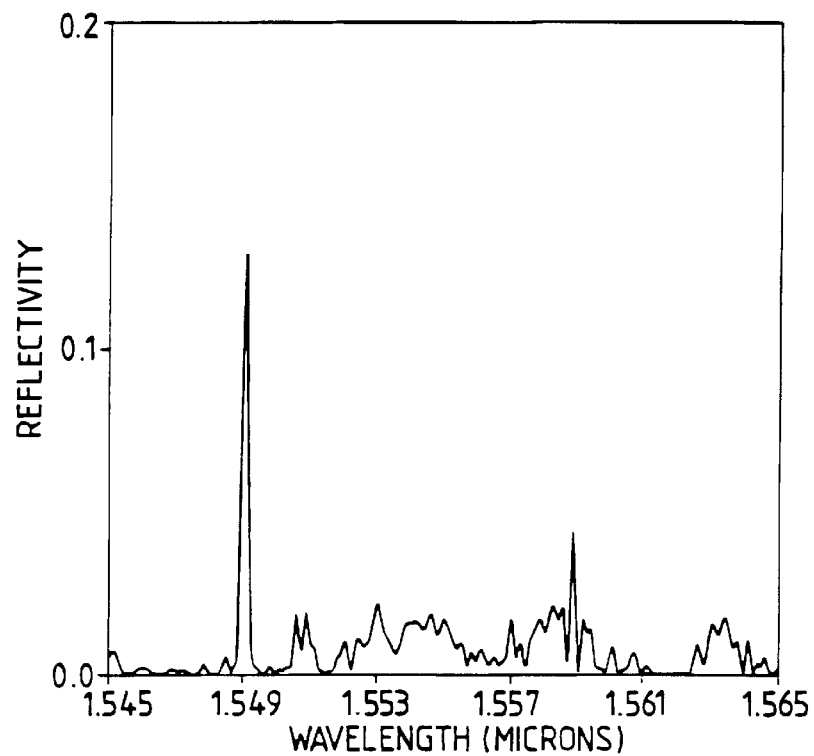
FIGS. 14(a), (b), and (c), (d) show the four theoretical reflection responses from a single grating having four sub-units of variable refractive index.
Figure 14B:
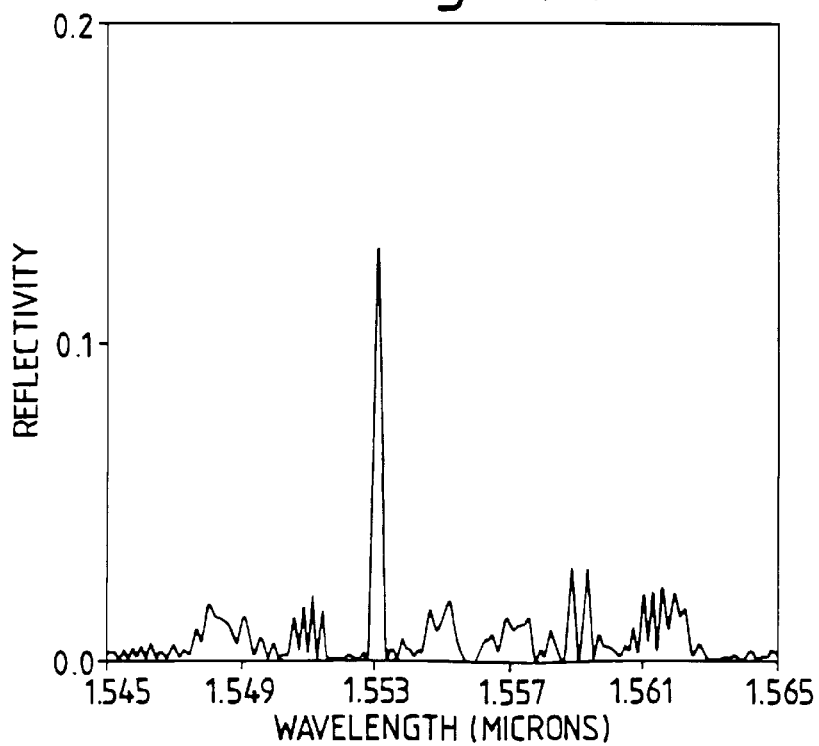
Figure 14C:
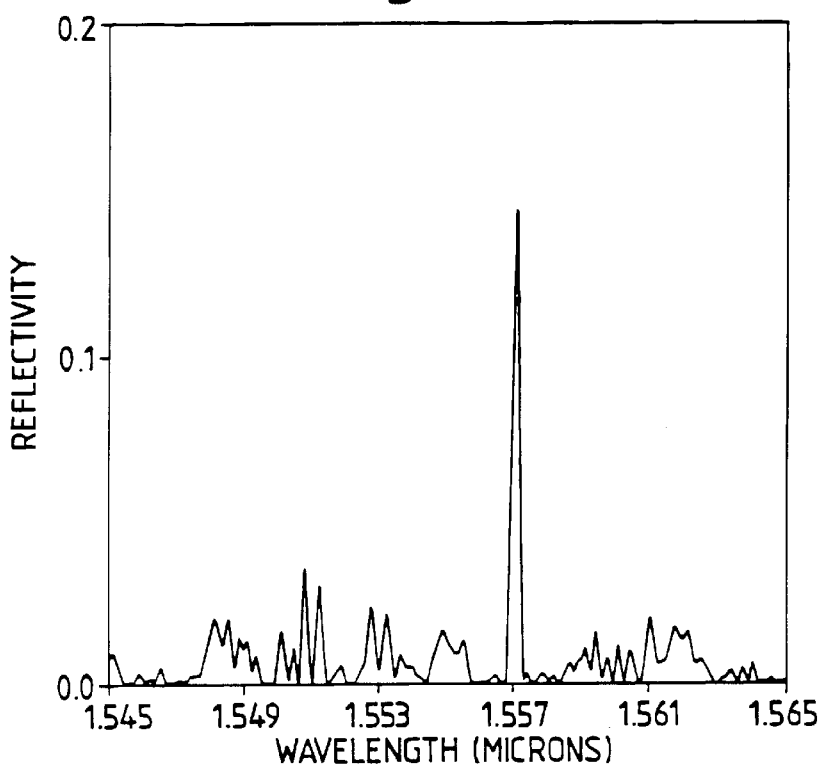
Figure 14D:
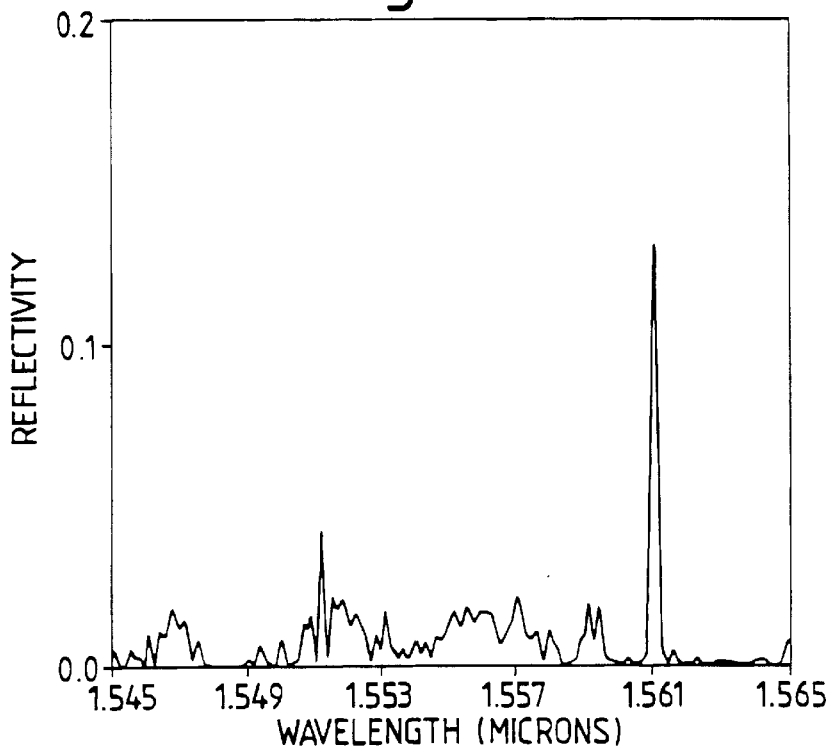

Referring to FIGS. 12(a) and 12(b) each of the stages of the design method will now be described in more detail, for a grating having s sub-units which is required to give R different reflection characteristics.

The initialisation stage comprises:
initialising the grating line patterns and R-refractive index sequences in the s sub-units. (These could either be random sequences or values read in from a previous calculation) and;
pre-calculating the scattering matrices for each of the grating line patterns at each of the allowed values of refractive indices.

The selection stage 46 comprises choosing at random a grating subsequence or a refractive index sub-un it in one of the switchable sequences (typically with the subsequence being slightly more likely to be chosen). Cycling the subsequence or index value through all the possible choices, until either a change is accepted or all the possibilities are exhausted, and then choosing another subsequence or index sub-unit to change.

If a grating subsequence is chosen to be changed then the recalculation stage 47 is the same as for the fixed response grating design method, i.e. only those matrices in the structure shown in FIG. 3 which are affected by the change are recalculated. However as mentioned above, the matrices need to be calculated N-times i.e. once for each of the N-target wavelength responses—corresponding to the N-switchable refractive index sequences of R-refractive index sections.

If a sub-unit refractive index is chosen to be changed then the recalculating stage 48 must take account of the change in index affecting all the levels in FIG. 3 below the level at which the index is changed. This is shown in FIG. 13.

A change to the refractive index value of the sub-unit labelled 1 in level 2 of FIG. 13 means that it is necessary to replace all of the scattering matrices affected at level 5 (numbers 8–15). Following this it is necessary to recalculate the matrices (4–7) at level (4) by pairwise multiplication in level (5), recalculate the matrices (2 & 3) at level (3) by pairwise multiplication in level (4), recalculate the matrix 1 at level 2 by multiplication of matrices 2 & 3 in level (3), Multiply the old matrix 0 with the new matrix 1 to give a new matrix 0 at level (1).

Multiply the new matrix 0 with the old matrix 1 to give the new scattering matrix.

Thus $4+2+1+2+9=((32/4-1)-\log_2(4))$ matrix operations are needed to update the scattering matrix as opposed to 31 with a more conventional algorithm.

In contrast to the calculation for a grating subsequence change, these matrices need only to be calculated once—as, in a refractive index change only one section (out of he R available) in one refractive index sequence (of the N-available) is change at a time. The remaining matrices corresponding to the (N-1) sequences that were not changed at this point, are unaltered.

Having made a change, either of grating subsequence or of sub-unit index the next stage 48 is to decide whether to accept this change. This will depend on whether the change gives a better fit to the N-desired or target responses, hence the measure of difference used previously for the fixed grating response design method is modified to account for the R different refractive index sequences for the s sub-units of the grating. Thus $$\beta^2 = \sum_{i=1\cdot N} \left( \int (\alpha |R_T(\lambda, i)|^2 - |R_A(\lambda, i)|^2)^2 d\lambda \right)$$

where $$\alpha = \frac{\sum_{i=1\cdot N} \left( \int |R_T(\lambda, i)|^2 \cdot |R_A(\lambda, i)|^2 d\lambda \right)}{\sum_{i=1\cdot N} \left( \int |R_T(\lambda, i)|^4 d\lambda \right)}$$

the extra suffix, "i"' denotes the coefficients corresponding the i'th refractive index sequence.

The final measure of fit is formed from these two quantities: $V=(1-w)\cdot\alpha-w\cdot\beta$ where w is a weighting parameter.

V is then used in an optimisation or annealing algorithm in precisely the same way as previously described in order to decide whether to accept the change (in grating subsequence or sub-unit index) or not.

If the change is accepted the current grating sequence and refractive index sequences are saved and the iteration is repeated by again choosing a grating sub-sequence or sub-unit index to change. Once a certain number of iterations or a predetermined measure of fit has been reached the design process is stopped.

The result of the design process is one sequence of grating lines and R sequences of refractive indices for the s sub-units.

FIGS. 14(*a*), (*b*) and (*c*), (*d*) show the four difference theoretical reflection responses of a grating having s=4 (and T=4). Each response corresponds to a particular sequence of refractive index values for the grating sub-units. It can be seen that the reflection responses are separated by 4 nm giving a total tuning range of 12 nm. Fine tuning to give a reflection response intermediate between any of the four shown is achieved by altering the refractive index of all four sub-units uniformly, while tuning between each of the responses shown is achieved by switching from one of the sub-unit refractive index sequences determined by the design method to another such sequence.

If the maximum index change utilised in the design of the grating of FIGS. 14(*a*)–(*d*) were applied to a conventional grating a tuning range of only 3–4 nm would result, thus the design achieves a significantly larger tuning range.

Although the design method for a grating having a variable reflection response has been described for gratings in which the response is changed by a change of refractive index, it will be apparent to the skilled man, that, in the method, refractive index can be replaced by any other parameter which will affect the reflection response of the grating, for example the local stressing or stretching of a sub-unit of the grating.

What is claimed is:

1. A method of fabricating a refractive optical grating having a pattern of grating lines along a single light path, said grating lines extending transversely to said light path and being arranged one after another along the light path, the method comprising the steps of:

a) calculating a refractive grating response along said single light path for a refractive grating having a pattern of grating lines defined by a sequence of grating building block forms selected from a set of predetermined grating building block forms for which mathematical models are available, the calculation being performed using mathematical models of individual grating building block forms of the sequence of grating building block forms, said grating building block forms comprising arrangements of one or more grating lines from which a grating can be build up;

b) comparing said calculated refractive grating response with a target response and deriving a measure of the fit therebetween;

c) repeatedly modifying the sequence of grating building block forms and calculating a refractive grating response for each of the modified sequences, using the mathematical models of individual grating building block forms of the modified sequences, comparing the refractive grating response of each grating defined by a modified sequence with a target response and deriving a measure of the fit therebetween until said fit for a grating defined by said modified sequence conforms to a predetermined criterion; and d) forming the grating for which said fit conforms to said criterion, the grating formed having a pattern of grating lines along said single light path, all of said grating lines extending transversely to said light path and being arranged one after another longitudinally along said light path.

2. A method as claimed in claim 1 in which each performance of step (c) produces a modified sequence of grating building block forms differing from the preceding modified sequence of grating building block forms in that one grating building block form has been changed for another.

3. A method as claimed in claim 1 in which calculating the grating response in step (c) includes deriving a mathematical model of a subsequence of said modified sequence of grating building block forms using the models representing the grating building block forms comprised in said subsequence and using the model of said subsequence in subsequent performances of step (c) when the subject modified sequence again includes said subsequence.

4. A method as claimed in claim 1 in which in step (c) the feature differentiating the present modified sequence from the preceding modified sequence is retained in the succeeding modified sequence if the resulting change in said measure of fit is such that $$e^{\left(-\frac{|\delta v|}{T}\right)}$$

is less than a random number generated in the range 0 to 1, where $v$ is a predetermined measure of the calculated performance and T is a value selected to condition step (b) such that said fit ends to approach said criterion.

5. A method as claimed in claim 4 in which T is selected anew for each performance of step (c) such that T decreases monotonically with each performance of step (c).

6. A method as claimed in claim 5 in which the measure of fit $v=(1-\omega)\alpha-\omega\beta$ where $\omega$ is a weighting parameter between 0 and 1, and $$\beta^2 = \int (\alpha|R_T|^2 - |R_A|)^2 d\lambda$$

$$\text{where } \alpha = \frac{\int (|R_T|^2 \cdot |R_A|^2 d\lambda)}{\int (|R_T|^4 d\lambda)},$$

$R_T$ is said target response and $R_A$ is said calculated response.

7. A method as claimed in claim 5 in which the measure of fit $v=(1-\omega)\alpha-\omega\beta$ where $\omega$ is a weighting parameter between 0 and 1, and $$\beta^2 = \sum_{i=1...N} \left( \int (\alpha|R_T(\lambda, i)|^2 - |R_A(\lambda, i)|^2)^2 d\lambda \right)$$

$$\text{where } \alpha = \frac{\sum_{i=1...N} \left( \int |R_T(\lambda, i)|^2 \cdot |R_A(\lambda, i)|^2 d\lambda \right)}{\sum_{i=1...N} (\int |R_T(\lambda, i)|^4 d\lambda)},$$

$R_T$ is said target response, $R_A$ is said calculated response, $\lambda$ is wavelength and i denotes coefficients corresponding to an ith refractive index sequence.

8. A method as claimed in claim 1 in which each performance of step (c) produces a modified sequence of grating building block forms differing from the preceding modified sequence of grating building block forms in that two portions of the preceding modified sequence have been transposed.

9. A method of fabricating a refractive optical grating having a pattern of grating lines along a single light path, said grating lines extending transversely to said light path and being arranged one after another longitudinally along the light path, the method comprising the steps of:

a) selecting a plurality of pre-calculated models of grating building block forms representing a refractive optical grating comprising a sequence of grating building block forms, said grating building block forms comprising arrangements of one or more grating lines from which a grating having a useful function can be built up;

b) calculating models of a hierarchical set of subsequences of the sequence using said models of grating building block forms;

c) calculating a refractive grating response along said single light path for the grating defined by said sequence using models of an upper level of said hierarchical set of subsequences;

d) comparing said calculated refractive grating response with a target response and deriving a measure of the fit therebetween;

e) if said measure of fit does not meet a predetermined criterion, repeating the steps of:
  i) modifying said sequences;
  ii) re-calculating only the models of said hierarchical set of subsequences affected by said modification;
  iii) calculating a refractive grating response of the grating defined by said modified sequence using an upper level of said hierarchical set of subsequences; and
  iv) comparing said calculated refractive grating response with a target response
  and deriving a measure of the fit therebetween;
  until said predetermined criterion is met, and f) forming the grating defined by the sequence for which said criterion is met, the grating formed having a pattern of grating lines along said single light path, all of said grating lines extending transversely to said light path and being arranged one after another longitudinally along said light path.

10. A method as claimed in claim 9 in which each performance of step (e)(i) produces a modified sequence of grating building block forms differing from the preceding sequence of grating building block forms in that one grating building block form has been changed for another.

11. A method as claimed in claim 9 in which each performance of step (e)(i) produces a modified sequence of grating building block forms differing from the preceding sequence of grating building block forms in that two grating building block forms of the preceding sequence have been transposed.

12. A method as claimed in claim 9 in which modifications made in step (e)(i) retained in the succeeding modified sequence if the resulting change in said measure of fit is such that $$e^{\left(-\frac{|\delta v|}{T}\right)}$$

is less than a random number generated in the range 0 to 1, where $v$ is a predetermined measure of the calculated performance and T is a value selected to condition step (e) such that said fit tends to approach said criterion.

13. A method as claimed in claim 12 in which T is selected anew for each performance of step (e) such that T decreases monotonically with each performance of step (e).

14. A method as claimed in claim 13 in which the measure of fit $v=(1-\omega)\alpha-\omega\beta$ where $\omega$ is a weighting parameter between 0 and 1, and $$\beta^2 = \int (\alpha|R_T|^2 - |R_A|)^2 d\lambda$$

$$\text{where } \alpha = \frac{\int (|R_T|^2 \cdot |R_A|^2 d\lambda)}{\int (|R_T|^4 d\lambda)},$$

$R_T$ is said target response and $R_A$ is said calculated response.

15. A method as claimed in claim 13 in which the measure of fit $\nu=(1-\omega)\alpha-\omega\beta$ where $\omega$ is a weighting parameter between 0 and 1, and $$\beta^2 = \sum_{i=1...N} \left( \int (\alpha|R_T(\lambda, i)|^2 - |R_A(\lambda, i)|^2)^2 d\lambda \right)$$

$$\text{where } \alpha = \frac{\sum_{i=1...N} \left( \int |R_T(\lambda, i)|^2 \cdot |R_A(\lambda, i)|^2 d\lambda \right)}{\sum_{i=1...N} (\int |R_T(\lambda, i)|^4 d\lambda)},$$

$R_T$ is said target response, $R_A$ is said calculated response, $\lambda$ is wavelength and i denotes the coefficients corresponding to the ith refractive index sequence.

16. A method of fabricating a refractive optical grating having a pattern of grating lines along a single light path, said grating lines extending transversely to said light path and being arranged one after another, longitudinally along the light path, the method comprising the steps of:
   a) selecting a plurality of pre-calculated models of grating building block forms, from a set of such grating building block forms, to form a representation of a refractive optical grating defined by a sequence of grating building block forms from said set, said grating building block forms comprising arrangements of one or more grating lines from which a grating having a useful function can be build up;
   b) calculating a refractive grating response along said single light path for the grating defined by the sequence,
   c) comparing said calculated refractive grating response with a target response and deriving a measure of the fit therebetween;
   d) repeatedly
      i) modifying the sequence of grating building block forms;
      ii) calculating a refractive grating response of the grating defined by the modified sequence;
      iii) comparing the calculated refractive grating response of the grating defined by the modified sequence with a target response and deriving a measure of the fit therebetween;
      iv) if the present measure of fit has a predetermined relationship with the preceding measure of fit, retaining the most recent modification when the sequence is next modified;
      until the measure of fit meets a predetermined criterion;
   e) fabricating the grating defined by the present form of the sequence, the grating fabricated having a pattern of grating lines along said single light path, all of said grating lines extending transversely to said light path and being arranged one after another longitudinally along said light path.

17. A method as claimed in claim 16 in which each performance of step (d)(i) produces a modified sequence of grating building block forms differing from the preceding sequence of grating building block forms in that one grating building block form has been changed for another.

18. A method as claimed in claim 16 in which calculating the grating response in step (d)(i) produces a modified sequence of grating building block forms differing from the preceding sequence of grating building block forms in that two grating building block forms of the preceding sequence have been transposed.

19. A method as claimed in claim 16 in which calculating the grating response in step (d)(ii) includes deriving a mathematical model of a subsequence of said modified sequence of grating building block forms using the models representing the grating building block forms comprises in said subsequence and using the model of said subsequence in subsequent performances of step (d)(ii) when the subject sequence again includes said subsequence.

20. A method as claimed in claim 16 in which said relationship comprises a change in said measure of fit such that $$e^{\left(\frac{|\delta \nu|}{T}\right)}$$

is less than a random number generated in the range 0 to 1, where $\nu$ is a predetermined measure of the calculated performance and T is a value selected to condition step (e) such that said fit tends to approach said criterion.

21. A method as claimed in claim 20 in which T is selected anew for each performance of step (d)(iv) such that T decreases monotonically with each performance of step (d)(iv).

22. A method as claimed in claim 21 in which the measure of fit $\nu=(1-\omega)\alpha-\omega\beta$ where $\omega$ is a weighting parameter between 0 and 1, and $$\beta^2 = \int (\alpha|R_T|^2 - |R_A|)^2 d\lambda$$

$$\text{where } \alpha = \frac{\int (|R_T|^2 \cdot |R_A|^2 d\lambda)}{\int (|R_T|^4 d\lambda)},$$

$R_T$ is said target response and $R_A$ is said calculated response.

23. A method as claimed in claim 21 in which the measure of fit $\nu=(1-\omega)\alpha-\omega\beta$ where $\omega$ is a weighting parameter between 0 and 1, and $$\beta^2 = \sum_{i=1...N} \left( \int (\alpha|R_T(\lambda, i)|^2 - |R_A(\lambda, i)|^2)^2 d\lambda \right)$$

$$\text{where } \alpha = \frac{\sum_{i=1...N} \left( \int |R_T(\lambda, i)|^2 \cdot |R_A(\lambda, i)|^2 d\lambda \right)}{\sum_{i=1...N} (\int |R_T(\lambda, i)|^4 d\lambda)}$$

$R_T$ is said target response, $R_A$ is said calculated response, $\lambda$ is wavelength and i denotes the coefficients corresponding to the ith refractive index sequence.

* * * * *